June 21, 1966    E. G. POTTER ETAL    3,257,602
PORTABLE POWER SUPPLY
Filed April 27, 1962

INVENTORS
Edward G. Potter &
Robert K. Bruce
BY Diggins & LeBlanc
ATTORNEYS

United States Patent Office 3,257,602
Patented June 21, 1966

3,257,602
PORTABLE POWER SUPPLY
Edward George Potter and Robert Kenneth Bruce, both of Lima, Ohio, assignors to The Lima Armature Works, Inc., Lima, Ohio, a corporation of Ohio
Filed Apr. 27, 1962, Ser. No. 190,741
3 Claims. (Cl. 321—8)

This invention relates to a portable power supply and more particularly to an improved portable power supply for motor vehicles.

Under certain weather or mechanical conditions, such as during extremely cold weather, many types of internal combustion motors, as for example those used in commercial vehicles, are difficult to "turn over" or start. Such difficulty in starting places an undue load on the conventional storage battery utilized for furnishing power to the motor starter and other electrical systems. As is well known, this excessive drain of power from the storage battery will not only result in the storage battery being completely discharged if the drain continues for any period of time, but will also damage and thus shorten the effective life of the rather expensive battery.

Even though various power sources which operate from the practically inexhaustible source of power furnished from a conventional alternating current power line have been proposed and constructed to supplement or "boost" the starting power available for starting various motors, none has proved very successful. This lack of success in utilizing the power available on commercial power lines for starting internal combustion motors can be attributed largely to the cost, weight and low power capacity of these various power sources.

According to the present invention, it has now been found that a portable power supply which is small, light, inexpensive and yet has a large power capacity can be constructed using novel circuit elements, and construction technique. This portable power supply utilizes a step-down transformer and a pair of relatively small, inexpensive solid state diodes of the ceramic type which have a high current carrying capacity and peak inverse voltage characteristic to insure long life. The mounting of these diodes and transformer is such as to require a minimum amount of space but which will insure adequate cooling for each of the elements.

Accordingly, the primary object of this invention is to provide a portable power supply which is energized from an alternating current commercial power line and is capable of producing a low voltage, high current output.

Another object of this invention is to provide a portable power supply utilizing high density ceramic diodes in a full wave rectifier circuit.

Yet another object of this invention is to provide a novel mounting for a pair of high density ceramic diodes utilized in a portable power supply.

Still another object of this invention is to provide a novel mounting arrangement for a hypersil steel auto transformer used in a portable power supply.

A further object of this invention is to provide a portable power supply which has the above enumerated desirable characteristics yet is small, light and inexpensive to produce and operate.

These and further objects and advantages of this invention will become more apparent upon reference to the following description, claims and appended drawings wherein:

Figure 1:
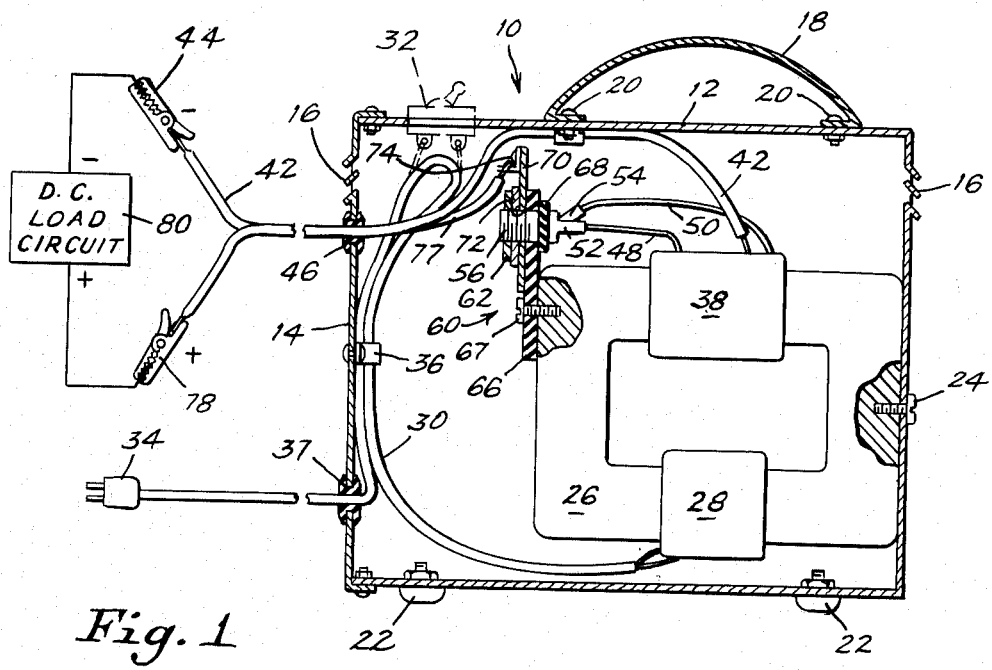
FIGURE 1 is a cross-sectional view of a power supply constructed in accordance with the present invention.

With continuing reference to the accompanying drawings wherein like reference numerals designate similar parts throughout the various views, and with initial attention directed to FIGURE 1, reference numeral 10 is used to generally designate a portable power supply constructed in accordance with the concepts of the present invention. The power supply is housed within a metal housing or case 12 which has a removable end cover 14 and air vents 16 formed through its walls for ventilation. A carrying handle 18, which is secured to the housing by suitable bolts 20, is mounted on the top of the housing for facilitating the carrying of the power supply. Rubber cleats 22 are secured to the bottom of the housing 12 for permitting the power supply to be set on the fender of an automobile, for example, without damaging the finish of the vehicle.

Mounted flush against the closed end of the housing 12 by a metal screw 24 is an auto transformer core 26 constructed of hypersil steel the use of which permits a reduction in physical size of the transformer while a large output current capacity is maintained. The fact that the core 26 is bolted in firm physical contact with the end of the metal housing is important since this insures the maximum amount of heat transfer from the core 26 to the housing thus permitting the core to operate at a substantially lower temperature with any given current output.

The primary input winding 28 is wrapped around one leg of the core 26 and is connected through a power cord 30 and a power plug 34 to a source of alternating current such as a conventional household power outlet. An on-off toggle switch 32, which is shown in broken line form, can be included in the power cord 30 for controlling the operation of the power supply whenever such is desirable. To prevent the power cord 34, which may be made of the rubber cover type, from moving about during the carrying and use of the power supply, a clamp 36 is secured over the cord and to the end cover 14 of the housing. An insulator 37 of the feed-through type is also provided for preventing the rubber covered power cord from being cut or frayed by the sharp edge of the aperture through which it passes.

A center-tapped secondary output winding 38 is wrapped around the opposite leg of the core 26 as seen in FIGURE 1. The center tap 40 of the winding is connected through a rubber covered type power cord 42 to a detachable clamp 44 which is, preferably, of the alligator type. An insulator type feed-through 46 is provided for preventing the rubber covered power cord from being cut by the sharp edge of the aperture through which it passes.

Figure 2:
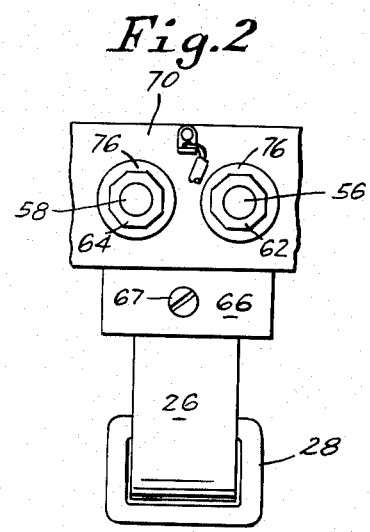
FIGURE 2 is an end view of the supporting arrangement utilized for mounting and cooling the high density ceramic diode bridge circuit.

The output leads 48 and 50 of the secondary winding 38 are connected to the anode leads 52–54, respectively, of two high density ceramic diodes 56 and 58 which possess a high peak reverse voltage characteristic and high current carrying capacity, thus insuring a long effective life. As seen in FIGURE 1, the ceramic diodes 56 and 58 are of the threaded cathode base type and are mounted on a supporting arrangement 60 and secured thereto by nuts 62 and 64 (FIGURE 2).

The support arrangement 60 for the diodes 56 and 58 comprises insulating strip 66, which is preferably formed of Bakelite, mounted directly to the transformer core 26 by means of a bolt or screw 67. A pair of apertures 68 (one of which is shown in FIGURE 1) are provided in the upper end of the insulator strip 66 through which the threaded bases of the diodes 56 and 58 are mounted. A metal terminal and heat conducting junction plate 70 also has a pair of apertures 72 formed therein through which the diodes are threaded. Metal lock washers 76 are used to securely grip the nuts 62 and 64 against the plate 70. A terminal conductor 74 is bolted or otherwise electrically connected to the plate 70 for electrically coupling the output power cord 77 to the cathodes of the diodes 56–58. A second alligator type detachable clip 78, which serves as the positive output terminal of the power supply, is connected to the end of the power cord 77.

Figure 3:
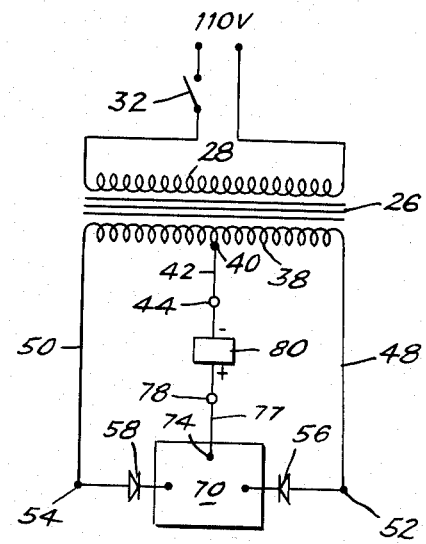
FIGURE 3 is a schematic diagram of the power supply of the present invention.

In reference to FIGURE 3, it is seen that when the switch 32 is closed thereby connecting the winding 28 to the 110-volt alternating current power source, the center tap secondary winding 38 will be energized and will act to "step down" the voltage of the power source to a desired level such as, for example, 12 volts, while increasing the current appearing at its output leads. Then, during one-half of the alternating current cycle, the high density ceramic diode 56 will pass current to a direct current load 80 such as a starter circuit for a motor while the diode 58 is in a non-conducting state for this direction of current flow. During the next half cycle, the high density ceramic diode 58 passes current to the load and diode 56 is non-conducting.

The heat produced by the core 26 during the operation of the power supply is effectively dissipated by the end of the housing 12 abutting the core and by the air circulating through the vents 16. The heat created by the diodes 56 and 58 is effectively conducted away by the metal plate 70 which not only serves as a heat dissipating device but also as a common terminal or junction for the cathodes or the diodes. If desirable, the plate 70 can be provided with cooling fins to further speed the dissipation of heat produced by the diodes but this is generally not necessary.

From the foregoing, it is readily seen that the use of a novel mounting for both the core and diodes of the power supply permits adequate cooling of the electrical elements yet permits the power supply to be built into a substantially smaller unit. Also, by utilizing a core fabricated from hypersil steel and diodes of the high density ceramic type, the overall efficiency of the power supply has been increased while the size, weight and manufacturing costs have been substantially reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable motor starter circuit for operating from a source of alternating current comprising a metal housing, air vents formed in the wall of said housing, a transformer including a hypersil steel core having a primary and a center-tapped secondary winding thereon, means for securing said core directly to the vented wall of said metal housing for dissipating the heat generated in said core during the operation of said starter circuit, a supply circuit including switch means mounted on said metal housing for selectively connecting said primary winding to said alternating current source, an apertured insulator block mounted on one end of said core, first and second high density ceramic diode rectifiers mounted within the apertures of said block and insulated by said block from said core, said first and second diodes each including a cathode and an anode, each anode being electrically connected to an output side of said secondary winding, a heat dissipating metal junction plate mounted in electrical contact with the cathodes of said diodes to connect said diodes in series opposition, said metal junction plate being insulated from said anodes and said core by said insulating block and operating to dissipate heat generated during the operation of said diodes, terminal means connected to said junction plate, a first conductor means connected to said terminal means and extending outside said metal housing, and a second conductor means connected to the center-tap of said secondary winding and extending outside said metal housing, said first and second conductor means being adapted for connection externally of said metal housing to the terminals of a direct current load circuit.

2. A portable motor starter circuit according to claim 1 wherein said first and second conductor means includes detachable clipping means for releasably connecting said load circuit to said first and second conductor means.

3. A portable starter unit for operation from a source of alternating current comprising a housing, a transformer including a core having primary and secondary windings thereon, means for mounting said transformer within said housing, a supply circuit for connecting said primary winding to said alternating current source, said secondary winding having a center tap, a direct current load circuit having one side thereof connected to said center tap of said secondary winding, rectifying means including first and second unidirectional conducting means having first and second electrodes, said first electrode of each of said unidirectional conducting means being connected to opposite ends of said secondary winding, an electrically conductive, heat dissipating junction plate electrically and structurally connected to the second electrode of said first and second unidirectional conducting means, means for securing said rectifying means and said heat dissipating junction plate within said housing and insulating said heat dissipating junction plate from the electrodes of said rectifying means connected to the ends of said secondary winding and from said housing, wherein said securing and insulating means includes an apertured insulator block secured to said core, said first and second unidirectional conducting means being mounted within and extending through the apertures in said insulator block whereby said insulator block is positioned between said heat dissipating junction plate and the electrodes of said first and second unidirectional conducting means connected to the ends of said secondary winding, and conductor means connecting said junction plate and the other side of said direct current load circuit.

References Cited by the Examiner
UNITED STATES PATENTS

| | | | |
|---|---|---|---|
| 1,954,931 | 4/1934 | Hambuechen | 320—59 |
| 2,028,191 | 1/1936 | Chereton | 321—8 |
| 2,485,450 | 10/1949 | Kotterman | 321—8 |
| 2,540,841 | 2/1951 | Stancu | 320—59 |

OTHER REFERENCES

"Progress in Core Material for Small Transformers," by C. C. Horstman, published in Westinghouse Engineer (September 1952), pp. 160–163.

LLOYD McCOLLUM, *Primary Examiner.*

J. C. SQUILLARO, G. J. BUDOCK, *Assistant Examiners.*